April 7, 1959     A. P. LEIBINGER     2,880,789
SAFETY BELTS FOR AUTOMOBILES, AIRPLANES, AND
OTHER FAST MOVING VEHICLES
Filed Dec. 7, 1956
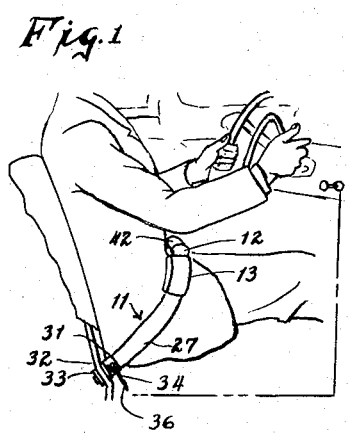
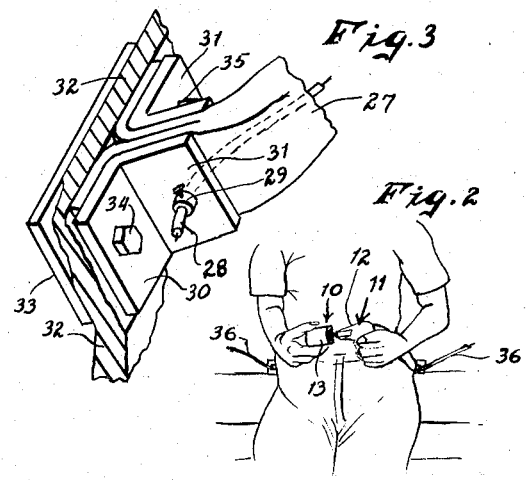
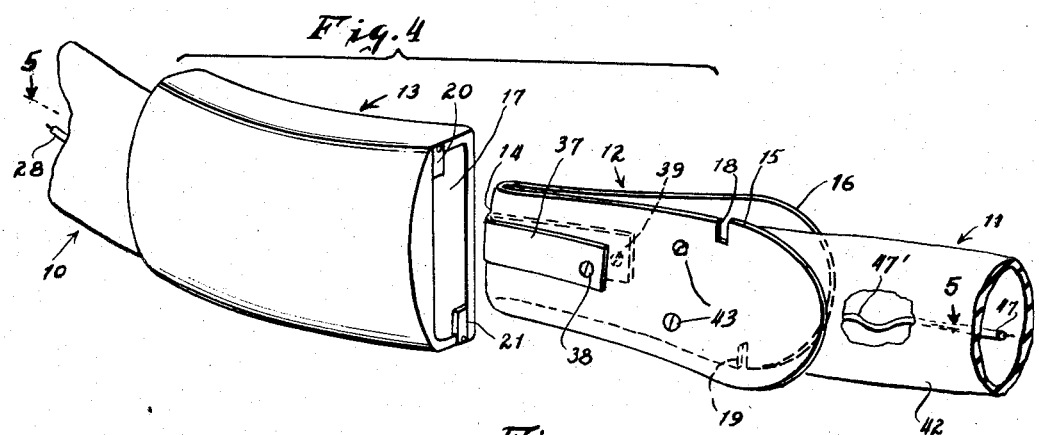
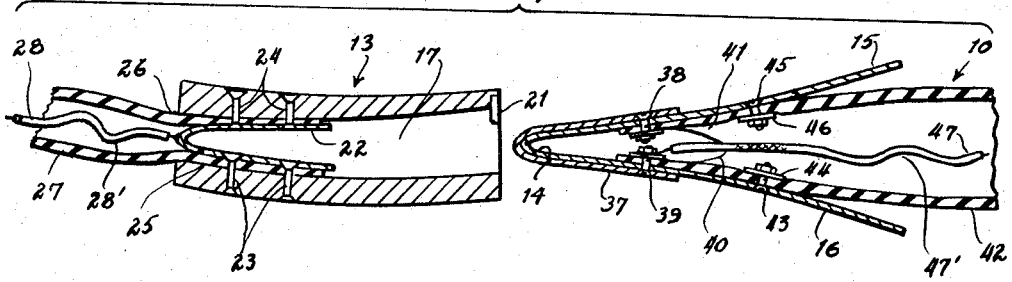
INVENTOR.
ALPHONSE P. LEIBINGER
BY
*L. S. Saulsbury*
ATTORNEY

United States Patent Office 2,880,789
Patented Apr. 7, 1959

2,880,789

SAFETY BELTS FOR AUTOMOBILES, AIRPLANES, AND OTHER FAST MOVING VEHICLES

Alphonse P. Leibinger, Douglaston, N.Y.

Application December 7, 1956, Serial No. 626,948

1 Claim. (Cl. 155—189)

This invention relates to safety belts for automobiles, airplanes, and other fast moving vehicles.

It is a principal object of the present invention to provide a safety belt which can be connected into the ignition circuit or some other critical control circuit or mechanism of an automobile to prevent thereby the operation of the vehicle until the safety belt has been closed about the passengers of the automobile.

It is another object of the invention to provide a safety belt formed of elastic material which is adapted to stretch under a predetermined pressure and in which there may be embedded or disposed a thin wire that is a part of the belt circuit which would snap under great stretching force of the belt to break the ignition circuit and to stop the automobile engine.

It is still another object of the invention to provide a safety belt arrangement which may be used with an indicating system of an airplane so the stewardess can readily determine which passenger may have or may not have their belts secured about them.

It is a further object of the invention to provide in belt coupling parts a simple contact arrangement and wherein the contact on the male member is held against the internal contact of the female member under the expanding pressure of a U-shaped male member and wherein the expanding pressure of the U-shaped member maintains the same in positive locked engagement with abutments on the female member projected laterally into the opening of the female member and the male member being releasable therefrom by squeezing together the handle portions thereof.

Other objects of the invention are to provide a safety belt construction having coupling parts adapted to be incorporated in the ignition circuit of an automobile, with the above objects in mind, which is of simple construction, has a minimum number of parts, inexpensive to manufacture, the coupling parts easily coupled with one another, has a simplified wiring arrangement, permits easy attachment of the belt parts with the wire terminal to the frame structure of the vehicle, of pleasing appearance, light in weight, yet strong and durable, effective and efficient in use.

For a better understanding of the invention, reference may be had to the following detailed description taken in connection with the accompanying drawing, in which Figure 1 is a pictorial view of an operator seated in a vehicle and with the safety belt strap arrangement of the present invention secured about him, Fig. 2 is a pictorial view showing the user of the safety belt in the process of fixing the coupling members together, Fig. 3 is an enlarged fragmentary view showing the clamping members for anchoring the belt to the back of the seat, Fig. 4 is an enlarged perspective and collective view of the coupling parts uncoupled from each other, and Fig. 5 is an enlarged and collective longitudinal sectional view of the male and female coupling members joined with one another, the view being taken on line 5—5 of Fig. 4.

Referring now to the figures, 10 and 11 respectively represent safety belt parts and which respectively have male and female coupling members 12 and 13. The male coupling member 12 is formed of a single piece of sheet material folded upon itself to provide an apex portion 14 and outwardly curved spring handle portions 15 and 16 adapted to be squeezed together to permit the easy insertion of the male coupling member 12 into opening 17 of female coupling member 13 and which upon being released will respectively cause their respective notches 18 and 19 to receive projections 20 and 21 diagonally disposed from one another and projecting laterally into the opening 17.

Within the opening 17 of the female member is a folded U-shaped contact 22 disposed at the lower end thereof and secured to the coupling member body by rivets 23 and 24. The U-shaped contact 22 and the rivets also join respective bifurcated projections 25 and 26 of an elastic belt strap 27 to the coupling member 13. A wire 28 is soldered to the contact 22 and has some slack therein as indicated at 28'. This wire extends through the elastic strap 27 and is adjustably anchored by a set collar 29 to clamping members 30 and 31 which secure the belt strap 27 to seat back 32. A clamping plate 33 is placed over the seat back 32 and the clamping members 30 and 31 made secured therewith to the back by clamp bolts 34 and 35.

Extended about the end of the male coupling member 12 is a U-shaped contact 37 that is respectively secured to the opposite spring handle portions 15 and 16 by respective fastening screws 38 and 39. These fastening screws also secure respective bifurcated portions 40 and 41 of elastic belt strap 42 to the respective handle portions 15 and 16 of the male member. The bifurcated portions 40 and 41 are further secured to the spring handle portions 15 and 16 by fastening screws 43 and clamping plate 44 and fastening screws 45 and clamping plate 46. A terminal wire 47 is secured by the fastening screw 39 to contact 37 and has a slack 47'. This wire extends through the elastic strap 42 and is similarly anchored to a terminal 29 of a clamp parts 30 and 31 for the elastic strap 42 that are attached to the opposite side of the seat back in the manner above described in connection Fig. 3.

To join the coupling parts together the end of the male member is slid into the opening 17 to the full extent to establish the connection of the contact 37 of the male member with the female contact 22 in the opening 17. When the male member is in its full home position and the handle portions 15 and 16 released the projections 20 and 21 on the male member will respectively register with the notches 18 and 19 of the handle portions 15 and 16. The male member will thereby be locked against separation from the female member. The ignition circuit will thereby be conditioned so that the ignition switch of the automobile will be made effective.

Under ordinary strain upon the belt strap the terminal wires 28 and 47 will not be placed under strain but under an emergency where the passenger has been unduly thrust forward the belt straps will stretch and the slacks 28' and 47' will be taken up and the wires caused to break so that the ignition circuit can be automatically cut in emergencies or accidents to prevent the ignition from setting fire to spilled gasoline. Secret terminals can be placed under the hood to bridge the safety belt terminals when the automobile is to be serviced or when the safety belts may have been broken or put out of use and awaiting repair.

It should now be apparent that there has been provided a simple safety belt arrangement for use with ignition systems wherein the coupling members can be readily joined together or detached from one another and wherein under undue strain upon the belt parts the wires therein can be broken to interrupt the flow of current through the ignition circuit of the automobile.

It will be apparent that these belts can be incorporated in an indicating system for use in airplanes to determine whether the passengers have their seat belts fastened.

While various changes may be made in the detail construction, it shall be understood that such changes shall be within the spirit and scope of the present invention as defined by the appended claim.

What is claimed is:

A safety belt construction comprising elastic straps and means adapted for anchoring said straps upon the back and opposite sides of a seat, coupling members respectively joined to the free ends of the elastic straps and respectively having contacts therein adapted to be engaged with one another when the coupling members are joined and wires respectively connected to the contacts and extending respectively through the straps and secured to the anchor means, said wires being slightly longer than the strap so that said wires normally have slack but under undue strain and stretch upon the elastic strap said wires are adapted to be broken whereby an ignition circuit controlled by the circuit belt will be automatically interrupted.

References Cited in the file of this patent
UNITED STATES PATENTS

| | | |
|---|---|---|
| 48,503 | Bailey | July 4, 1865 |
| 1,477,597 | Schneider | Dec. 18, 1923 |
| 2,510,115 | Jakosky | June 6, 1950 |
| 2,660,715 | Glass et al. | Nov. 24, 1953 |
| 2,777,531 | Erickson | Jan. 15, 1957 |